US012592374B2

(12) United States Patent
Kim et al.

(10) Patent No.: US 12,592,374 B2
(45) Date of Patent: Mar. 31, 2026

(54) ELECTRODE FOR SECONDARY BATTERY AND METHOD FOR MANUFACTURING THE SAME

(71) Applicant: LG ENERGY SOLUTION, LTD., Seoul (KR)

(72) Inventors: Hyun Tae Kim, Daejeon (KR); Hyun Chul Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 19/002,925

(22) Filed: Dec. 27, 2024

(65) Prior Publication Data

US 2025/0125324 A1     Apr. 17, 2025

Related U.S. Application Data

(62) Division of application No. 17/630,388, filed as application No. PCT/KR2020/010039 on Jul. 30, 2020, now Pat. No. 12,218,335.

(30) Foreign Application Priority Data

Jul. 30, 2019     (KR) ......................... 10-2019-0092474

(51) Int. Cl.
 *H01M 4/04*          (2006.01)
 *H01M 50/533*      (2021.01)
(52) U.S. Cl.
 CPC ........... *H01M 4/04* (2013.01); *H01M 50/533* (2021.01)
(58) Field of Classification Search
 None
 See application file for complete search history.

(56) References Cited

U.S. PATENT DOCUMENTS

| | | | |
|---|---|---|---|
| 6,300,002 B1 | 10/2001 | Webb et al. | |
| 2005/0284750 A1 | 12/2005 | Nishimura et al. | |
| 2006/0035152 A1 | 2/2006 | Nishimura et al. | |
| 2006/0092593 A1* | 5/2006 | Viavattine ........... | H01M 50/533 |
| | | | 361/303 |

(Continued)

FOREIGN PATENT DOCUMENTS

| | | |
|---|---|---|
| CN | 103155227 A | 6/2013 |
| CN | 106163725 A | 11/2016 |

(Continued)

OTHER PUBLICATIONS

WO2013031938 translation by Espacenet (Year: 2013).*

(Continued)

*Primary Examiner* — Jonathan G Leong
*Assistant Examiner* — Claire A Rutiser
(74) *Attorney, Agent, or Firm* — Birch, Stewart, Kolasch & Birch, LLP

(57)          ABSTRACT

An electrode for a secondary battery and a method for manufacturing the electrode are disclosed. According to an embodiment, a first cutting line and a second cutting line, along which an electrode sheet is cut, may cross each other to form a crossing area on the electrode sheet, and in the crossing area, the first cutting line may be formed as a straight line, and one end of the straight line may be connected to a curved line constituting a portion of the first cutting line, wherein the straight line may be connected to the curved line by a tangent line.

2 Claims, 4 Drawing Sheets

(56) References Cited

U.S. PATENT DOCUMENTS

| | | |
|---|---|---|
| 2006/0099493 A1 | 5/2006 | Nishimura et al. |
| 2014/0050959 A1 | 2/2014 | Ryu et al. |
| 2014/0072867 A1 | 3/2014 | Vonderhagen et al. |
| 2014/0255755 A1 | 9/2014 | Kwon et al. |
| 2016/0126597 A1 | 5/2016 | Ryu et al. |
| 2017/0012262 A1 | 1/2017 | Lanciotti et al. |
| 2019/0259979 A1 | 8/2019 | Ryu et al. |
| 2020/0044230 A1 | 2/2020 | Son et al. |
| 2020/0152958 A1 | 5/2020 | Lee et al. |
| 2020/0251786 A1* | 8/2020 | Kawai ............... H01M 10/0413 |

FOREIGN PATENT DOCUMENTS

| | | |
|---|---|---|
| CN | 206825583 U | 1/2018 |
| EP | 3 340 358 A1 | 6/2018 |
| JP | 10-270014 A | 10/1998 |
| JP | 2004-253356 A | 9/2004 |
| JP | 2013-543638 A | 12/2013 |
| JP | 2017-512652 A | 5/2017 |
| KR | 10-2013-0116880 A | 10/2013 |
| KR | 10-2013-0133659 A | 12/2013 |
| KR | 10-2017-0020996 A | 2/2017 |
| KR | 10-2017-0062877 A | 6/2017 |
| KR | 10-2019-0048862 A | 5/2019 |
| KR | 10-2019-0057587 A | 5/2019 |
| KR | 10-2019-0086901 A | 7/2019 |
| WO | WO-2013031938 A1 * | 3/2013 .............. H01M 4/02 |
| WO | WO-2019116761 A1 * | 6/2019 ........ H01M 10/0413 |

OTHER PUBLICATIONS

Daidoji (WO 2013031938 A1) English Translation. (Year: 2013).
Extended European Search Report for European Application No. 20847879.2 dated Jul. 27, 2022.
International Search Report for PCT/KR2020/010039 mailed on Nov. 6, 2020.
Written Opinion of the International Searching Authority for PCT/KR2020/010039 mailed on Nov. 6, 2020.

* cited by examiner

ELECTRODE FOR SECONDARY BATTERY AND METHOD FOR MANUFACTURING THE SAME

CROSS-REFERENCE TO RELATED APPLICATION

This application is a Divisional of U.S. application Ser. No. 17/630,388, filed on Jan. 26, 2022, which is the National Phase under 35 U.S.C. § 371 of International Application No. PCT/KR2020/010039, filed on Jul. 30, 2020, which claims the benefit of the priority of Korean Patent Application No. 10-2019-0092474, filed on Jul. 30, 2019, all of which are hereby expressly incorporated by reference into the present application.

TECHNICAL FIELD

The present invention relates to an electrode for a secondary battery and a method for manufacturing the same, and more particularly, to an electrode for a secondary battery having an atypical shape and a method for manufacturing the electrode.

BACKGROUND ART

In general, a secondary battery that is repetitively chargeable and dischargeable has a regular shape such as a rectangular parallelepiped shape, a cylindrical shape, and the like. However, as electronic devices are diversified in shape, and the need to maximize utilization of an internal space of such an electronic device increases, the shape of the secondary battery mounted inside the electronic device is also required to be atypical, unlike the related art.

In the case of the secondary battery having an atypical shape, generally, an electrode assembly having an atypical shape is manufactured and is accommodated in an exterior such as a pouch type exterior, and then, the exterior is sealed to manufacture the secondary battery.

However, when the shape of an electrode constituting the electrode assembly is out of the desired shape, there has been a problem that the electrode is damaged while the electrode assembly is accommodated in the exterior. Particularly, in a process of cutting the electrode using a mold to manufacture the electrode having the atypical shape, if an electrode defect occurs on an area, on which the electrode is notched, due to undesirable movement of the mold or the electrode, the aforementioned problem of damage of the electrode frequently occurs.

DISCLOSURE OF THE INVENTION

Technical Problem

Accordingly, an object of the prevent invention is to solve the problem of damage of the electrode in a process of manufacturing a secondary battery having an atypical shape.

Technical Solution

According to an aspect of the present invention for achieving the above object, a method for manufacturing an electrode comprises: a first cutting step of cutting a portion of an electrode sheet along a first cutting line (N1) comprising a closed curve to form a first electrode having a shape corresponding to the closed curve of the first cutting line (N1); and a second cutting step of additionally cutting a portion of the electrode sheet along a second cutting line (N2) comprising a closed curve to form a second electrode having a shape corresponding to the closed curve of the second cutting line (N2), which is separated from the first electrode formed in the first cutting step, after the first cutting step, wherein the first cutting line (N1) and the second cutting line (N2) cross each other to form a crossing area (C1) on the electrode sheet, wherein, in the crossing area (C1), the first cutting line (N1) is formed as a first straight line (SL1), and one end of the first straight line (SL1) is connected to a curved line (CL) constituting a portion of the first cutting line (N1), and wherein the first straight line (SL1) is connected the curved line (CL) by a tangent line.

In the crossing area (C1), the second cutting line (N2) may be formed as a second straight line (SL2) crossing the first straight line (SL1) of the first cutting line (N1).

In the first cutting step and the second cutting step, an overall shape of the first cutting line (N1) and an overall shape of the second cutting line (N2) may be the same.

The first electrode and the second electrode formed in each of the first cutting step and the second cutting step may comprise: a first body part having a first width (W1) and extending by a first length (L1) in a first direction (D1); and a second body part having a second width (W2) less than the first length (L1) and extending from one end of the first body part by a second length (L2) in a second direction (D2).

The crossing area (C1) may be formed on one end, which is adjacent to the first electrode formed in the first cutting step, of opposite ends of the second body part of the electrode formed in the second cutting step in a direction of the second length (L2).

In the first electrode and the second electrode formed in each of the first cutting step and the second cutting step, the first direction (D1) and the second direction (D2) may be perpendicular to each other.

Each of the first electrode and the second electrode formed in the first cutting step and the second cutting step may be formed in plurality.

Each of the first electrodes and the second electrodes formed in the first cutting step and the second cutting step may comprise an electrode tab, and at least some of the plurality of electrode tabs that are respectively formed on the first electrodes and the second electrodes formed in the first cutting step and the second cutting step may protrude in directions opposite to each other.

The first electrode formed in the first cutting step and the second electrode formed in the second cutting step may be in contact with each other by using an area, on which the first cutting line (N1) and the second cutting line (N2) overlap each other, as a boundary.

According to another aspect of the present invention for achieving the above object, an electrode for a secondary battery comprises: a first body part having a first width (W1) and extending by a first length (L1) in a first direction (D1); and a second body part having a second width (W2) less than the first length (L1) and extending from one end of the first body part by a second length (L2) in a second direction (D2), wherein an area on which two straight lines meet each other is formed on at least one of corners of one end of the second body part in a direction of the second length (L2), wherein one end of one straight line of the two straight lines is connected to a curved line, and wherein the one straight line is connected to the curved line by a tangent line.

An angle (θ) at which the two straight lines meet each other may be an obtuse angle.

Advantageous Effects

According to the present invention, the problem of damage of the electrode, which occurs in the process of manufacturing the secondary battery having the atypical shape, may be solved.

MODE FOR CARRYING OUT THE INVENTION

Hereinafter, a method of manufacturing an electrode and an electrode for a secondary battery according to the present invention will be described with reference to the accompanying drawings.

Method for Manufacturing Electrode

Figure 1:
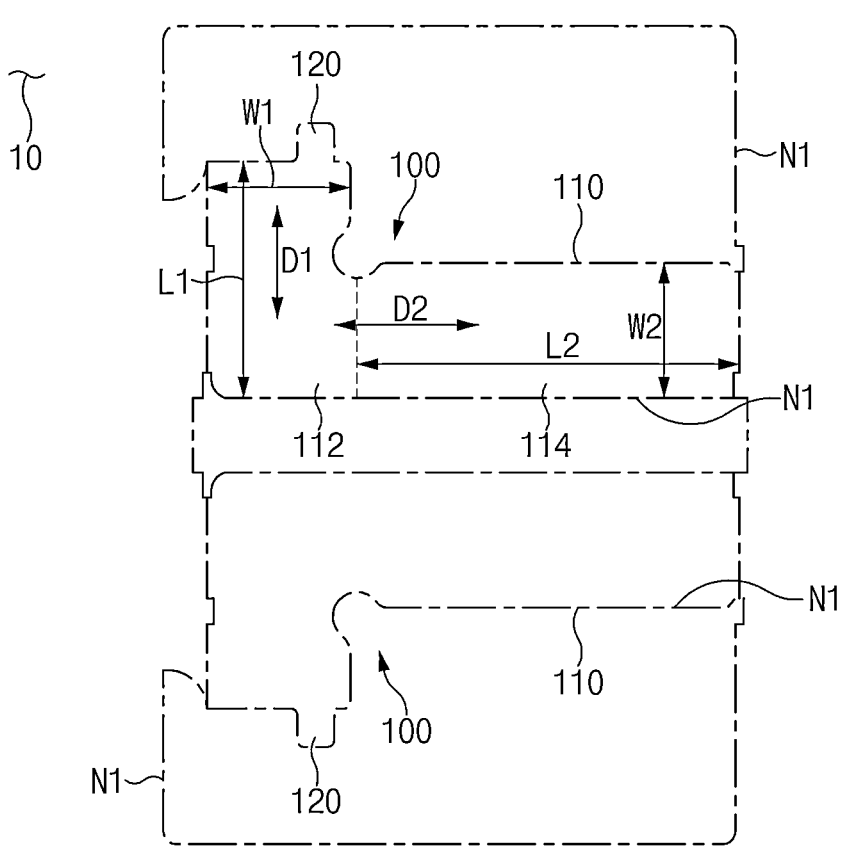
FIG. 1 is a plan view illustrating a first cutting line formed on an electrode sheet by a first cutting step in a method for manufacturing an electrode according to the present invention.
Figure 2:
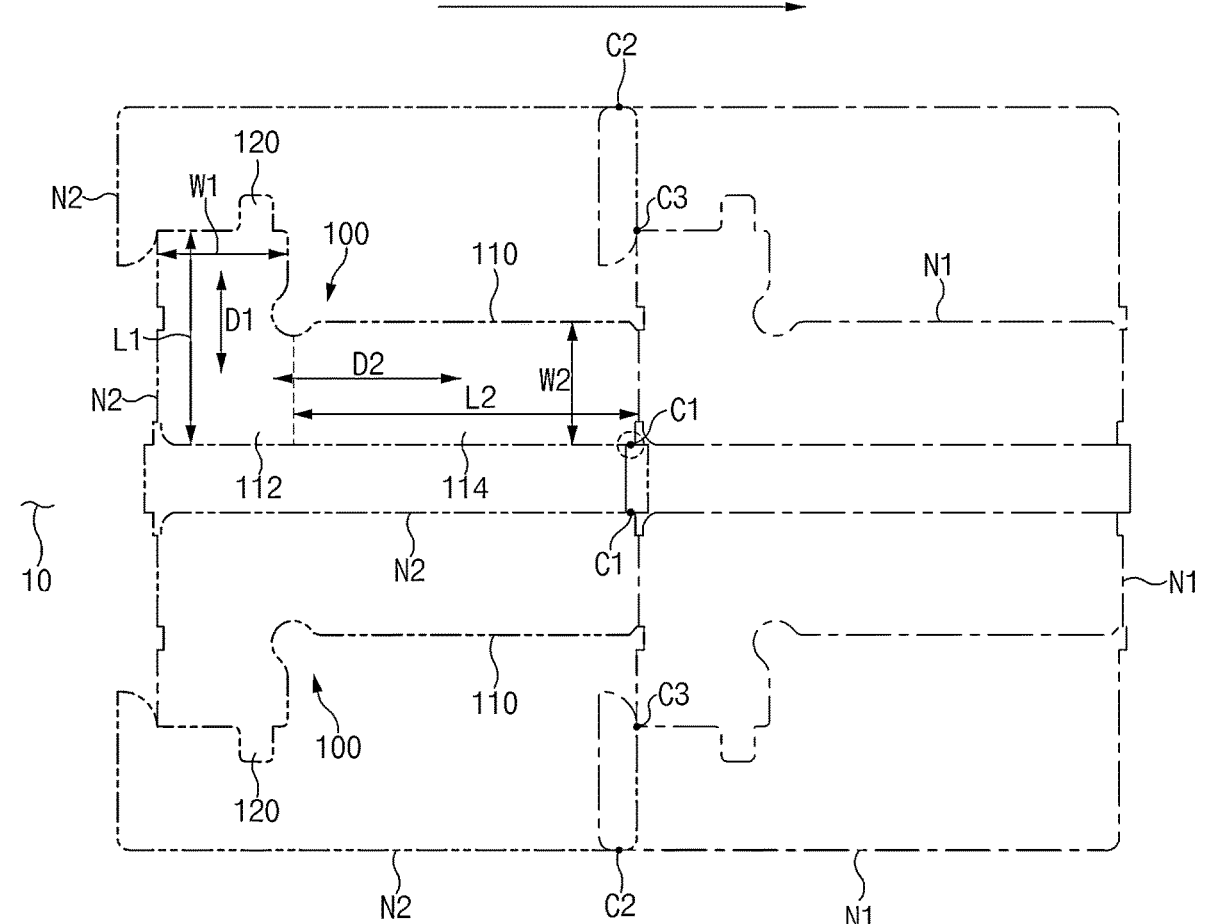
FIG. 2 is a plan view illustrating a second cutting line formed on the electrode sheet by a second cutting step in the method for manufacturing the electrode according to the present invention.

FIG. 1 is a plan view illustrating a first cutting line formed on an electrode sheet by a first cutting step in a method for manufacturing an electrode according to the present invention, and FIG. 2 is a plan view illustrating a second cutting line formed on the electrode sheet by a second cutting step in the method for manufacturing the electrode according to the present invention.

As illustrated in FIG. 1, a method for manufacturing an electrode according to the present invention may comprise a first cutting step of cutting a portion of an electrode sheet 10 to form an electrode 100. In more detail, in the first cutting step, the electrode sheet 10 may be cut along a first cutting line N1. In FIG. 1, the first cutting line N1 is illustrated as a dash-single dotted line.

Here, the first cutting line N1 may comprise a closed curve. In the first cutting step, the electrode 100 may have a shape corresponding to the closed curve provided in the first cutting line N1. FIG. 1 illustrates a case in which two electrodes are formed symmetrical to each other on the electrode sheet 10 by the first cutting step.

As illustrated in FIG. 2, the method for manufacturing the electrode according to the present invention may further comprise a second cutting step which is performed after the first cutting step and in which a portion of the electrode sheet 10 is additionally cut to form an electrode that is separated from the electrode formed in the first cutting step. In more detail, in the second cutting step, the electrode sheet 10 may be cut along a second cutting line N2. In FIG. 2, the first cutting line N1 formed in the first cutting step is illustrated as the dash-single dotted line, and the second cutting line N2 formed in the second cutting step is illustrated as a dash-double dotted line.

Like the first cutting line N1, the second cutting line N2 may also comprise a closed curve. Even in the second cutting step, the electrode 100 may have a shape corresponding to the closed curve provided in the second cutting line N2.

Also, each of the first cutting line N1 and the second cutting line N2 may comprise a plurality of closed curves. That is, according to the present invention, a plurality of electrodes 100 may be formed in each of the first cutting step and the second cutting step. FIGS. 1 and 2 illustrate a case in which two electrodes are formed symmetrical to each other on the electrode sheet 10 in each of the first cutting step and the second cutting step.

Here, the second cutting step may be performed after the first cutting step is performed on the electrode sheet 10, and the electrode sheet 10 moves in one direction. Also, a mold (not shown) for cutting the electrode sheet 10 in the first cutting step and a mold for cutting the electrode sheet 10 in the second cutting step may be the same. Thus, in the first cutting step and the second cutting step in the method for manufacturing the electrode according to the present invention, the overall shape of the first cutting line N1 and the overall shape of the second cutting line N2 may be the same. Thus, the shape of the electrode formed in the first cutting step and the shape of the electrode formed in the second cutting step may also be the same.

A structure of the electrode formed in each of the first cutting step and the second cutting step is as follows. That is, as illustrated in FIGS. 1 and 2, the electrode 100 formed in each of the first cutting step and the second cutting step may comprise a body part 110 forming a body of the electrode and an electrode tab 120 protruding from the body part 110 in one direction. Here, the body part 110 may comprise a first body part 112 having a first width W1 and extending by a first length L1 in a first direction D1 and a second body part 114 having a second width W2 less than the first length L1 and extending from one end of the first body part 112 by a second length L2 in a second direction D2. This may be understood that the body part 110 has an L-shape as illustrated in FIGS. 1 and 2. Thus, as illustrated in FIGS. 1 and 2, in the body part 110, the first direction D1 and the second direction D2 may be perpendicular to each other.

At least some of the plurality of electrode tabs 120 that are respectively formed on the plurality of electrodes 100 formed in the first cutting step and the second cutting step may protrude in directions opposite to each other. FIGS. 1 and 2 illustrate a state in which, in the two electrodes 100 respectively formed in the first cutting step and the second cutting step, the electrode tab 120 of the electrode 100 formed on an upper portion of the electrode sheet 10 protrudes upward, and the electrode tab 120 of the electrode 100 formed on a lower portion of the electrode sheet 10 protrudes downward.

According to the present invention, as illustrated in FIG. 2, the first cutting line N1 and the second cutting line N2 may overlap each other on a portion of the areas. Here, the electrode formed in the first cutting step and the electrode formed in the second cutting step may be in contact with each other by using an area, on which the first cutting line N1 and the second cutting line N2 overlap each other, as a boundary. In FIG. 2, although the boundary between the electrode formed by the first cutting line N1 and the electrode formed by the second cutting line N2 is illustrated as the dash-single dotted line, this is merely illustrated as the dash-single dotted line for convenience, and actually may be an area on which the first cutting line N1 and the second cutting line N2 overlap each other.

Continuously, referring to FIG. 2, according to the present invention, the first cutting line N1 and the second cutting line N2 that are respectively formed in the first cutting step and the second cutting step may cross each other. As a result, crossing areas C1, C2, and C3 that are areas on which the first cutting line N1 and the second cutting line N2 cross each other may be formed on the electrode sheet 10. The crossing areas may be formed in plurality. FIG. 2 illustrates a case in which total six crossing areas are formed. Here, in this specification, two crossing areas formed at positions symmetrical to each other will be denoted by the same reference numeral.

Here, referring to FIG. 2, at least a portion of the crossing areas may be formed on one end, which is adjacent to the electrode formed in the first cutting step, of both ends of the second body part 114 of the electrode formed in the second cutting step in a direction of the second length L2 (i.e., a right end of the second body part of the electrode formed in the second cutting step). In this specification, the crossing area formed on one end, which is adjacent to the electrode formed in the first cutting step, of both the ends of the second body part 114 of the electrode formed in the second cutting step in the direction of the second length L2 is indicated by a reference symbol C1. Unless otherwise specified below, the term 'crossing area' means a crossing area indicated by the reference symbol C1.

Figure 3:
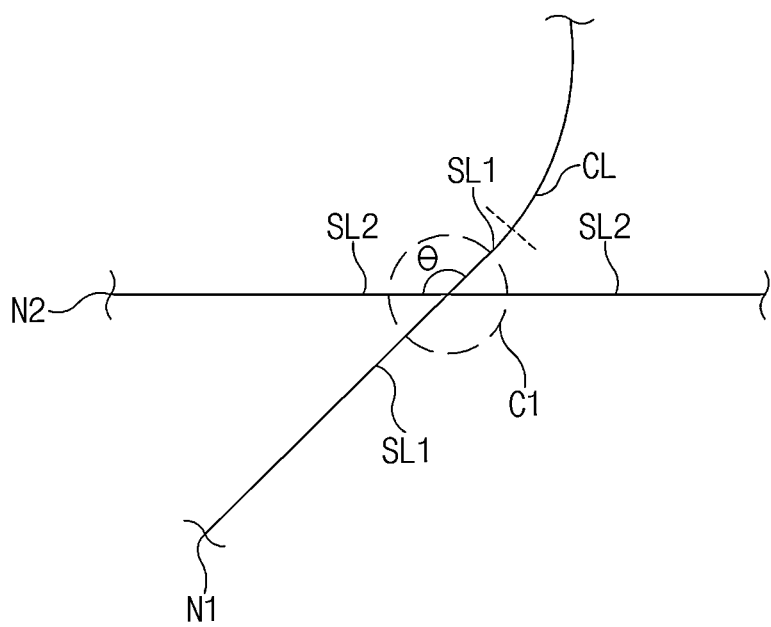
FIG. 3 is an enlarged plan view illustrating one of crossing areas of the first cutting line and the second cutting line in the method for manufacturing the electrode according to the present invention.

FIG. 3 is an enlarged plan view illustrating one of the crossing areas of the first cutting line and the second cutting line in the method for manufacturing the electrode according to the present invention.

As illustrated in FIG. 2, the first cutting line N1 formed in the first cutting step and the second cutting line N2 formed in the second cutting step may cross each other to form a crossing area C1 on the electrode sheet.

According to the present invention, the first cutting line N1 and the second cutting line N2 may cross each other in a straight line on the crossing area C1. In the following, a straight line of the first cutting line N1, which is formed on the crossing area C1, will be indicated by a reference symbol SL1, and a straight line of the second cutting line N2, which is formed on the crossing area C1, will be indicated by a reference symbol SL2.

According to the present invention, as illustrated in FIG. 3, one end of the straight line SL1 of the first cutting line N1, which is formed on the crossing area C1, may be connected to a curved line CL constituting the first cutting line N1, and the straight line SL1 may be connected to the curved line CL by a tangent line. That is, according to the present invention, an inclination of the straight line SL1 of the first cutting line N1, which is formed on the crossing area C1, and a tangent inclination of the curved line CL at a point at which the curved line CL and the straight line SL1 meet each other may be the same.

According to the present invention, in the process of manufacturing the secondary battery by using the electrode having the atypical shape, damage of the electrode may be minimized.

Figure 4:
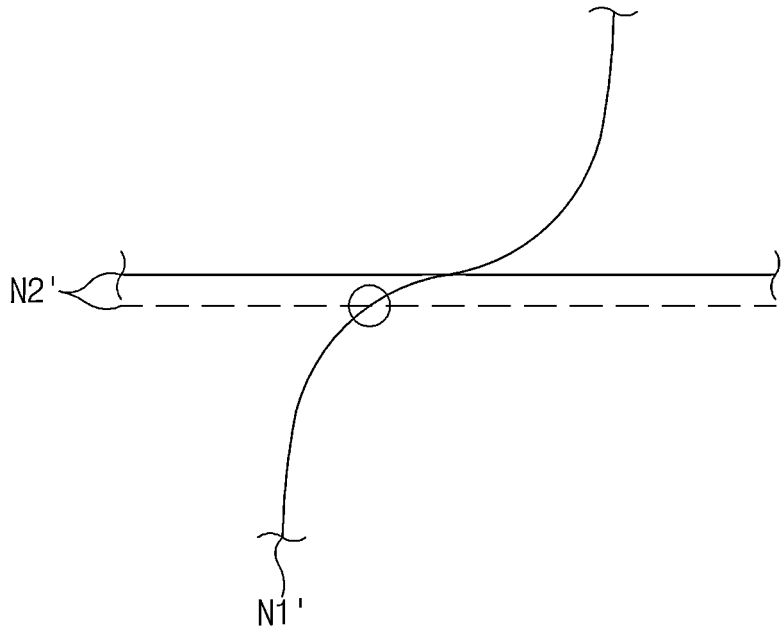
FIG. 4 is an enlarged plan view illustrating a crossing area of a first cutting line and a second cutting line in a method for manufacturing an electrode according to a comparative example.

FIG. 4 is an enlarged plan view illustrating a crossing area of a first cutting line and a second cutting line in a method for manufacturing an electrode according to a comparative example.

A first cutting line N1' is formed in a curved shape with a point of inflection on an area on which a first cutting line N1' and a second cutting line N2' cross each other according to a comparative example. Here, if the inclination of the first cutting line N1' and the inclination of the second cutting line N2' are the same at the point of the inflection, when the point at which the first cutting line N1' and the second cutting line N2' cross each other is the point of the inflection, i.e., referring to FIG. 4, when the second cutting line N2' is formed along a solid line, an electrode having a smooth corner may be manufactured.

However, when the first cutting line N1' and the second cutting line N2' do not cross each other at the point of the inflection due to undesired movement of an electrode sheet or a mold, an electrode having an angular corner may be manufactured.

Particularly, when the second cutting line N2' is formed below the point, at which the point of the inflection is formed, in the first cutting line N1', i.e., referring to FIG. 4, when the second cutting line N2 is formed along a dotted line, an electrode having a sharp corner may be manufactured. Particularly, as illustrated in FIG. 4, when the inclination of the first cutting line N1' is significantly changed as the first cutting line N1' is gradually away from the point of the inflection, since a curved area having a recessed shape is formed around a corner formed on the area on which the first cutting line N1' and the second cutting line N2' cross each other (an inner area of a circle illustrated in FIG. 4), a sharper corner may be formed. Particularly, when the sharp corner is formed on the electrode, the electrode may be damaged in a process of accommodating an electrode assembly comprising the electrode into an exterior.

However, according to the present invention, even when the point at which the first cutting line N1 and the second cutting line N2 cross each other is changed due to undesired movement of the electrode sheet or the mold, the electrode on which the corner having a uniform quality is formed may be manufactured.

That is, according to the present invention, since the area on which the first cutting line N1 and the second cutting line N2 cross each other is formed as the straight line, and also, the straight line SL1 of the first cutting line N1 is formed as the tangent line in the vicinity of the crossing area C1, a degree of sharpness of the corner of the electrode on the crossing area C1 may be remarkably improved compared to the comparative example to solve the problem of damage of the electrode.

According to the present invention, an angle θ between the first cutting line N1 and the second cutting line N2 on the area, on which the electrode is formed, among angles formed by meeting the first cutting line N1 and the second cutting line N2 on the crossing area C1 may be an obtuse angle.

Electrode for Secondary Battery

As illustrated in FIGS. 1 to 4, the electrode 10 for the secondary battery according to the present invention may comprise a body part 110 and an electrode tab 120 protruding from the body part 110 in one direction. Here, the body part 110 may comprise a first body part 112 having a first width W1 and extending by a first length L1 in a first direction D1 and a second body part 114 having a second width W2 less than the first length L1 and extending from one end of the first body part 112 by a second length L2 in a second direction D2. This may be understood that the body part 110 has an L-shape as described above.

Here, as illustrated in FIGS. 1 and 2, an area on which two straight lines meet each other may be formed on at least one of corners of one end of the second body part 114 in a direction of the second length L2, and one end of one straight line of the two straight lines may be connected to a curved line. Here, the one straight line may be connected to the curved line by a tangent line.

Also, as illustrated in FIG. 3, an angle θ at which the two straight lines meet each other may be an obtuse angle.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Electrode sheet
100: Electrode
110: Body part
112: First body part
114: Second body part
120: Electrode tab
C1, C2, C3: Crossing area
D1: First direction
D2: Second direction
L1: First length
L2: Second length
N1: First cutting line
N2: Second cutting line
W1: First width
W2: Second width

8

SL1: Straight line of first cutting line
SL2: Straight line of second cutting line
CL: Curved line of first cutting line

What is claimed is:

1. An electrode for a secondary battery, the electrode comprising:
   a first body part having a first width (W1) and extending by a first length (L1) in a first direction (D1); and
   a second body part having a second width (W2) less than the first length (L1) and extending from one end of the first body part by a second length (L2) in a second direction (D2),
   wherein an area on which two straight lines meet each other is formed at one corner of one end of the second body part in a direction of the second length (L2),
   wherein a first end of a first straight line of the two straight lines is connected to a curved line,
   wherein the first straight line is connected to the curved line by a tangent line,
   wherein the two straight lines meet each other at a first point,
   wherein the first point is spaced from the first end of the first straight line, and
   wherein a second straight line among the two straight lines and the curved line are located on a same side of the first straight line in a region where the electrode is formed.

2. The electrode of claim 1, wherein an angle (θ) at which the two straight lines meet each other is an obtuse angle.

* * * * *